US008666984B2

(12) United States Patent
Kim et al.

(10) Patent No.: US 8,666,984 B2
(45) Date of Patent: Mar. 4, 2014

(54) UNSUPERVISED MESSAGE CLUSTERING

(75) Inventors: Ki Yeun Kim, San Jose, CA (US); Lei Duan, San Jose, CA (US); Seokkyung Chung, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 24 days.

(21) Appl. No.: 13/051,299

(22) Filed: Mar. 18, 2011

(65) Prior Publication Data
US 2012/0239650 A1   Sep. 20, 2012

(51) Int. Cl.
*G06F 17/30*   (2006.01)

(52) U.S. Cl.
USPC .......................................................... 707/737

(58) Field of Classification Search
USPC .................................. 707/609, 737, 740–741
See application file for complete search history.

(56) References Cited

U.S. PATENT DOCUMENTS

| | | | | |
|---|---|---|---|---|
| 6,961,954 | B1* | 11/2005 | Maybury et al. | 725/53 |
| 7,158,966 | B2* | 1/2007 | Brill et al. | 1/1 |
| 7,685,265 | B1* | 3/2010 | Nguyen et al. | 709/223 |
| 7,765,574 | B1* | 7/2010 | Maybury et al. | 725/105 |
| 7,783,597 | B2* | 8/2010 | Kirsch | 707/609 |
| 2002/0049727 | A1* | 4/2002 | Rothkopf | 707/1 |
| 2002/0051077 | A1* | 5/2002 | Liou et al. | 348/465 |
| 2003/0198921 | A1* | 10/2003 | Ueda | 434/156 |
| 2007/0260695 | A1* | 11/2007 | Fenton | 709/207 |
| 2008/0040387 | A1* | 2/2008 | Schwartz et al. | 707/104.1 |
| 2008/0104061 | A1* | 5/2008 | Rezaei | 707/5 |
| 2009/0037469 | A1* | 2/2009 | Kirsch | 707/104.1 |
| 2009/0210406 | A1 | 8/2009 | Freire | |
| 2010/0083124 | A1* | 4/2010 | Druzgalski et al. | 715/738 |
| 2010/0205541 | A1 | 8/2010 | Rapaport et al. | |
| 2010/0257028 | A1* | 10/2010 | Hillerbrand | 705/10 |
| 2010/0312769 | A1* | 12/2010 | Bailey et al. | 707/740 |
| 2011/0004662 | A1* | 1/2011 | Dodsworth | 709/206 |
| 2011/0055723 | A1* | 3/2011 | Lightstone et al. | 715/752 |
| 2011/0125844 | A1* | 5/2011 | Collier et al. | 709/204 |
| 2011/0202537 | A1* | 8/2011 | Shamma et al. | 707/741 |
| 2011/0218931 | A1* | 9/2011 | Logan et al. | 705/319 |
| 2011/0231478 | A1* | 9/2011 | Wheeler et al. | 709/203 |
| 2011/0244882 | A1* | 10/2011 | Hancock | 455/456.1 |
| 2012/0179449 | A1* | 7/2012 | Raskino et al. | 704/2 |

OTHER PUBLICATIONS

Rosa, K. D.; Shah, Rushin; Lin, Bo; Gershman, Anatole; Frederking, Robert; "Topical Clustering of Tweets", Jul. 28, 2011, pp. 1-8. Website: http://www.cs.cmu.edu/~encore/sigir_swsm2011.pdf.*
Wanichayapong, N.; Pruthipunyaskul, Wasawat; Pattara-Atikom, Wasan; Chaovalit, Pimwadee; "Social-based Traffic Information Extraction and Classification", pp. 107-112.*

(Continued)

*Primary Examiner* — Sheree Brown
(74) *Attorney, Agent, or Firm* — Shook, Hardy & Bacon LLP

(57) ABSTRACT

Unsupervised clustering can be used for organization of micro-blog or other short length messages into message clusters. Messages can be compared with existing clusters to determine a similarity score. If at least one similarity score is greater than a threshold value, a message can be added to an existing message cluster. If a message is not similar to an existing cluster, the message can be compared against criteria for starting a new message cluster.

19 Claims, 6 Drawing Sheets

(56) References Cited

OTHER PUBLICATIONS

Ramage, et al., "Characterizing Microblogs with Topic Models" Published Date-2010, Association for the Advancement of Artificial Intelligence, http://nlp.stanford.edu/pubs/twitter-icwsm10.pdf.*

Bernstein, et al., "Eddi: Interactive Topic-based Browsing of Social Status Streams", In Proceedings of the 23rd annual ACM symposium on User interface software and technology, Oct. 3-6, 2010, 10 pages.

Sankaranarayanan, et al., "TwitterStand: News in Tweets", In Proceedings of the 17th ACM SIGSPATIAL International Conference on Advances in Geographic Information Systems, Nov. 4, 2009, 10 pages.

"Searching Tweets, Ranking and Clustering Them", Retrieved on: Jan. 10, 2011, http://www.seeks-project.info/site/?p=97.

"Twitter SEG the Tiger Woods Way: How Google Ranks Tweets", Retrieved Date: Jan. 10, 2011, http://www.seoptimise.com/blog/2010/01/twitter-seo-the-tiger-woods-way-how-google-ranks-tweets.html.

"Tweetbeat FAQ", Retrieved on: Jan. 10, 2011, http://tweetbeat.com/faq.

* cited by examiner

US 8,666,984 B2

UNSUPERVISED MESSAGE CLUSTERING

BACKGROUND

Messages having a short message length have become an important form of communication. Some services provide short message that are generally available to any person who subscribes. This can allow the short messages from these services to be searched for relevant content. Unfortunately, searching of short messages can pose difficulties, in part due to the limited content of the messages.

SUMMARY

Unsupervised clustering can be used for organization of micro-blog or other short length messages into message clusters. Messages can be compared with existing clusters to determine a similarity score. If at least one similarity score is greater than a threshold value, a message can be added to an existing message cluster. If a message is not similar to an existing cluster, the message can be compared against criteria for starting a new message cluster.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
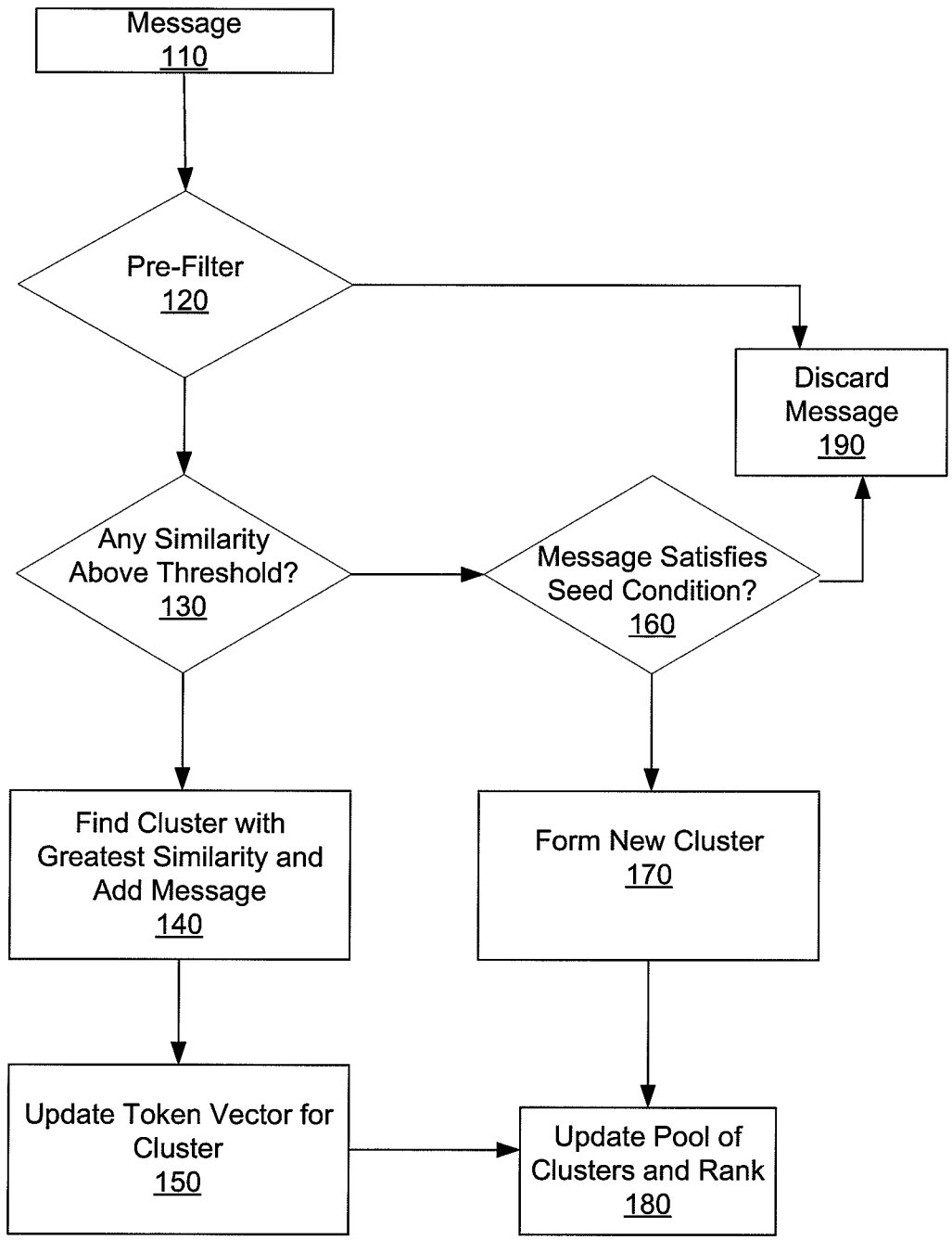
FIG. 1 shows a schematic flow chart of processing a message for addition to a cluster according to an embodiment of the invention.
Figure 2:
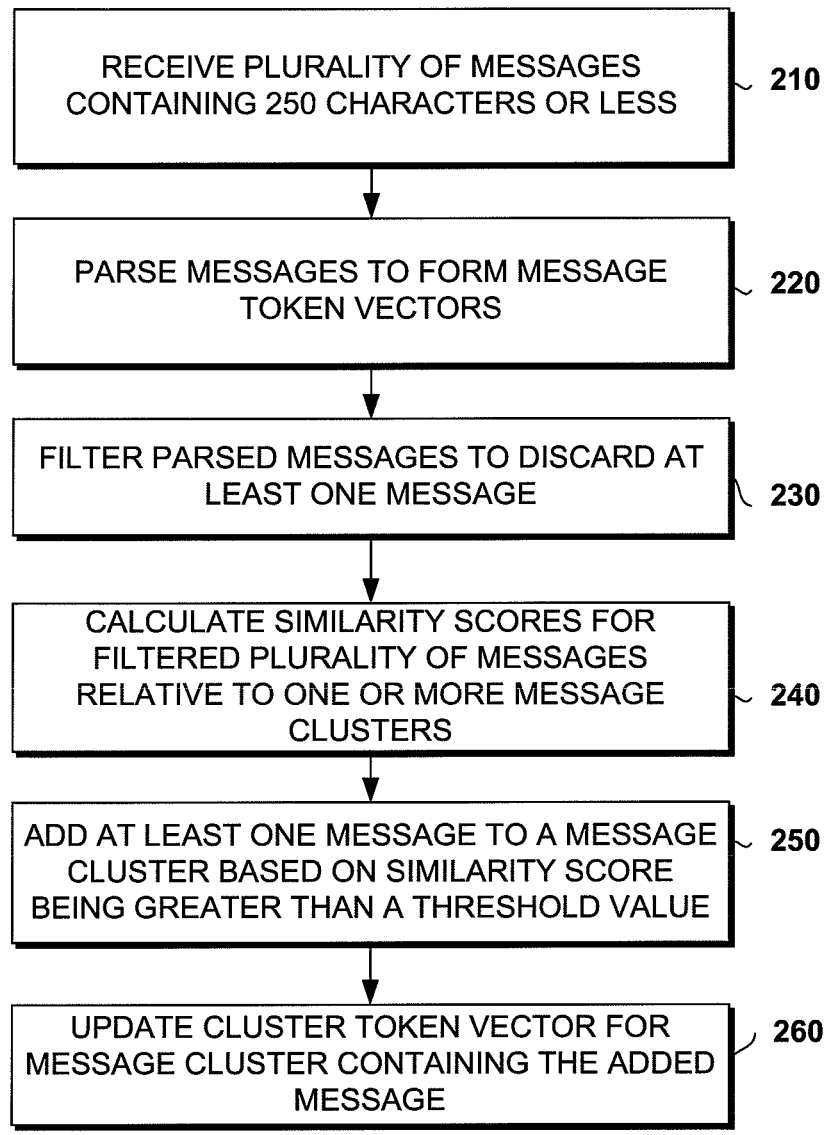
FIG. 2-4 show examples of methods according to various embodiments of the invention.
Figure 3:
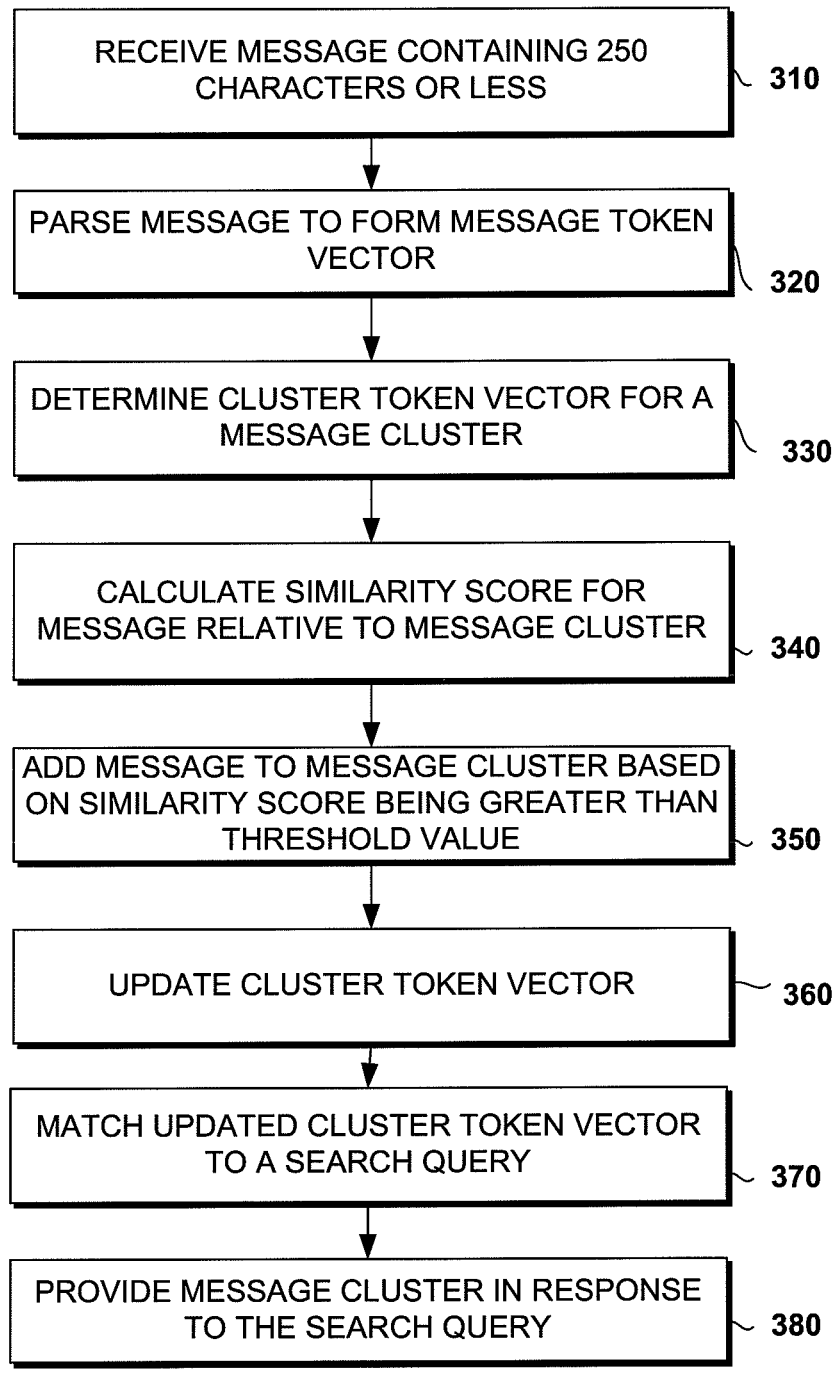
Figure 4:
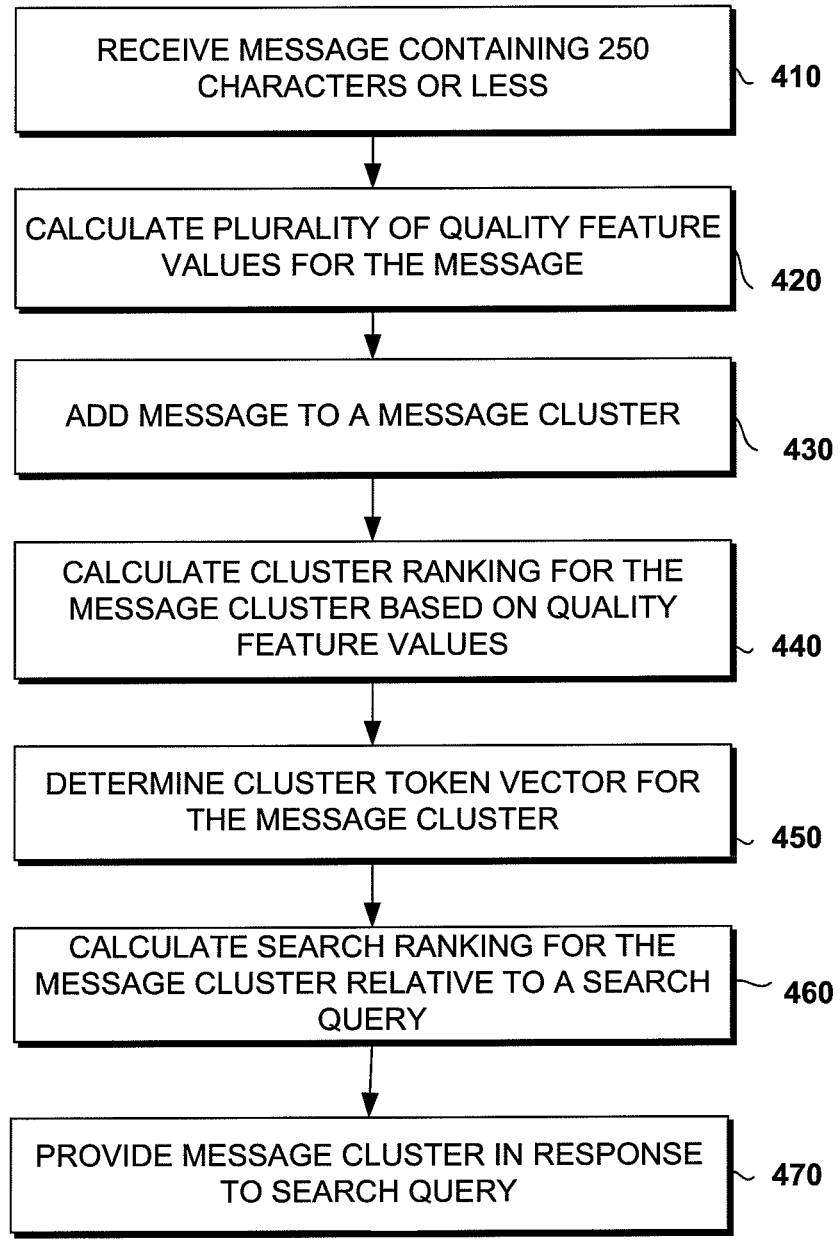

In various embodiments, systems and methods are provided for clustering of messages having a relatively small length, such as micro-blog entries or messages containing less than a fixed amount of characters. The systems and methods can allow for filtering of messages based on relevance, quality, and/or other factors. The filtered messages can then be assigned to an appropriate message cluster. If an appropriate message cluster does not exist, and if the message is of sufficient quality, a new message cluster can be started. The message clusters can then be used to facilitate keyword searching of the messages. The assigning of messages to message clusters can be performed without having to calculate normalized similarity values based on the length of the message.

Micro-blogging and other types of public or semi-public services for sending limited length messages are becoming increasingly popular. These messages can often have a limited number of characters, such as about 250 characters or less, or about 200 characters or less, or about 160 characters or less, or about 140 characters or less, or about 100 characters or less. A portion of the characters in a message can be used to provide a link to a longer message or other document available via a network.

Due to the short nature of the messages, ranking individual messages for keyword searching can be difficult. The low number of total characters in a short message can result in a correspondingly low number of individual word units, or "tokens" within a message. In this description, a "token" refers to a string of one or more characters that are considered together based on rules for parsing a message. For example, groupings of characters that are separated by a "space" character or a punctuation character can be considered a token. Another type of token can be the characters for a link to another document. Still other tokens may include spaces, punctuation, or other non-alphanumeric characters. Depending on the definition used for identifying a token, some tokens can correspond to multiple words and/or partial words. In yet other embodiments, any convenient type of definition can be used for determining the tokens within a message.

Because of the low number of tokens in a message, grouping of the messages can be useful. Grouping of messages can facilitate, for example, performing keyword searches on the features of the group of messages rather than the individual messages.

Ranking messages with a limited length using a supervised machine learning algorithm can have some known issues. Collecting labeled data for time sensitive documents, such as online social micro-blog data, can be challenging and expensive. Supervised learning algorithms can also require updates with fresh labeled data to reflect any changes in user behavior over time.

An unsupervised learning algorithm like clustering can have advantages for grouping documents that have content that is difficult to predict. Unfortunately, traditional clustering algorithms can require extensive computation to measure similarities between documents. Determining an optimal number of clusters can also consume computer resources. Furthermore, conventional clustering algorithms have not typically provided mechanisms for ranking the resulting clusters.

In various embodiments, an unsupervised learning algorithm is provided that can assist with clustering of documents containing a low number of characters and/or tokens. The unsupervised learning algorithm can perform an initial filtering to remove documents that are not desired. A message can be removed or excluded due to the presence of a feature associated with spam messages, and/or the message can be removed or excluded due to having a low quality score. A quality value can then be generated for the remaining documents to determine if a given document can be associated with an existing message cluster, or if the document can be used to form a new message cluster. Message clusters can also be ranked based on the contents of the cluster. In some embodiments, a characteristic vector of tokens can be determined for each message cluster to assist with identifying additional messages to add to the cluster. The cluster token vector can also be used for determining matches between a cluster and, for example, keywords from a search query.

In this discussion, a "token vector" is a representation of the tokens within a message or a cluster. The token vector can be thought of as a sparsely populated vector, where the possible vector elements correspond to the tokens that could be included in the vector. For an individual message containing less that a fixed amount of characters, only a limited number of tokens are possible. Thus, most vector elements for a message token vector would have a zero value, indicating that a given token is not present in the token vector. A message token vector would have a non-zero value for only the tokens present in the message. In this discussion, a token vector can be described as having a length that corresponds to the number of non-zero values in the token vector. It is noted that while a token vector is described herein as having zero and non-zero values, any other convenient set of designations can be used to indicate the presence or absence of a token.

In various embodiments, a characteristic vector can be used to represent the contents of a message cluster. This can be referred to as a cluster token vector. Instead of using a vector that represents all of the tokens in all of the messages within a message cluster, a cluster token vector can include non-zero values for only a representative number of the tokens. The representative tokens can be selected based on total frequency of appearance, or based on a weighted frequency of appearance that is normalized based on a frequency of appearance for tokens in a large corpus of documents.

In many cases, it may be convenient to store and/or use only the non-zero elements of a token vector. A token vector, such as a message token vector or a cluster token vector, can be represented by any convenient type of data format that indicates the tokens that are present in the message token vector or cluster token vector. For example, a listing of identifiers for the tokens present in a vector can be a representation of the vector. Optionally, a representation of a token vector can also include a weighting factor for the tokens present in the vector. This weighting factor can indicate, for example, the normalized likelihood of occurrence for a token in a corpus of documents. The weighting factor can also optionally indicate whether the token occurs multiple times within a message and/or a cluster.

Factors for Evaluating Messages for Inclusion in a Cluster

In order to build a message cluster, a number of factors can potentially be used for evaluating the quality of a message. These factors can include, for example, the general subject matter of the message or the number of tokens in the message. A factor for determining the quality of a message can be referred to as a quality feature. Optionally, a score can be associated with each quality feature in the form of a quality feature value. An arithmetic and/or geometric and/or logarithmic combination of the quality feature values can be used to determine a quality value for an individual message.

As a preliminary step to performing a quality evaluation on messages, the messages can be filtered to separate out any messages that are not appropriate for further evaluation. The preliminary filtering can be used to remove or exclude a variety of message types. One option can be to remove messages that originate from a domain and/or identifier that is known to be not desired. Such a domain and/or identifier could be a known source of spam, or a known source of explicit or adult material. Messages that include links to such domains can also be excluded. Another option can be to filter out messages that are not in a desired language. Still another option can be to filter out messages that appear to be intended for only a single recipient. Although a message is posted in a public or semi-public manner, one or more tokens within a message may indicate that the message is actually intended for a single recipient.

Still another option can be to use one or more of the above features, possibly in combination with other features, to develop a spam score for a message. Messages with a spam score above (or below) a threshold can be filtered out. For the remaining messages, the spam score can be retained as one quality feature value for determining the overall quality value of the message.

Any convenient number of messages can be removed by filtering. The number of messages removed by filtering can be at least about 5% of the messages received for evaluation, or at least about 10%, or at least about 25%, or at least about 50%. The number of messages removed by filtering can be about 95% or less, or about 75% or less, or about 50% or less, or about 25% or less.

Another factor that can be considered is the number of tokens within a message. This can also be referred to as the token length of the message. Although a message may have a maximum number of characters, some messages may have fewer than the maximum number of characters. The number of tokens in a message can be an indicator of the quality of the message. Optionally, the token length for a message can be based on the number of different (unique) tokens in the message.

Still other quality features that can be considered are related to the characteristics of the message. One characteristic can be whether a message has be forwarded or reposted by another user. In many situations, a message may initially be available to a subset of all potential readers. A second user who sees a message may choose to forward or repost the message to other users that typically read the second user's messages. When a forwarding or reposting event occurs, a message can be flagged to indicate the reposting. This can be used as a binary quality feature value to add to the score or quality value of a message. Optionally, additional requirements can be imposed for a message to gain the reposting flag or score. For example, it can be required that a user identification is associated with the forwarding or reposting event. Optionally, it can be required that the forwarding or reposting event is associated with a different user identifier than the user identifier associated with the original posting of the message. Still another option can be to require that the forwarding or reposting event is not associated with a known distributor of spam.

Another characteristic can be whether the message includes a link. Some links can be indicative of a spam message. However, the presence of a link in a non-spam message can indicate a message of higher quality. The presence of a link in a message can be another binary quality feature for determining a quality value for a message. Alternatively, the change in a quality value for a message due to the presence of a link can be dependent on any convenient factor.

Still other quality feature values can be based on the user who authored a message. A user that posts a message can have an authority score. The authority score can be based on one or more characteristics of a user. A portion of a user's authority score can be based on the relationship of the user to a message system. For example, an administrator of a message system can have a high authority score. Alternatively, a portion of an authority score can be based on the number of readers associated with a user. If a large number of people have subscribed to read messages from a user, that can be an indication that a user provides valuable or quality messages. Still another option can be to base an authority score in part on rankings of a first user provided by other users.

In an embodiment, an authority score can be based on the number of different users that read messages from a given user. One way of assigning such an authority score can be to have a logarithmic dependence of the authority score on the number of users. This can reflect the fact that some users may have only tens of readers, while other users may have thousands or more readers. A logarithmic dependence allows such wide variations in the number of readers to be easily captured within a quality feature value.

Ranking for a Message Cluster

As messages are added to a message cluster, a ranking can be determined for the cluster based on the messages in the cluster. One option can be to have a ranking value for a message cluster that is based on an average of quality feature values for the messages within a cluster. In an embodiment, the ranking for a cluster can be based on a combination of two or more of the average spam score, the average token length, the average score for reposting, the average score for a link being included, and the average authority score of the messages in the cluster. In another embodiment, the ranking for a cluster can be based on a combination of three or more of the above features, or four or more of the above features, or all of the above features. Optionally, the ranking for a cluster can also include a score based on the number of different (or unique) users that have contributed a message to the cluster. Each message can have an author, but the author for some messages may be the same. This factor can be expressed, for example, as a ratio of the number of different message authors relative to the total number of messages in a message cluster. This type of factor can give a higher ranking to message clusters with a larger number of different users as contributors.

For some quality features of the messages in a cluster, the quality feature may have a binary value. For example, in some embodiments the reposting value for a message represents that the message either satisfies the reposting criteria or it does not satisfy the criteria. This could be expressed as the reposting value being 1 or 0, but any other convenient values can be used instead. Similarly, the link value for a message may simply indicate the presence or absence of one or more links in a message. For quality features having this type of binary characteristic, there can be several options for using the individual message feature values to contribute to a ranking for a message cluster. One option could be to determine a conventional average of a reposting or link feature value, as described above. Another option could be to determine a ratio of messages that satisfy the reposting or link feature criteria versus messages that do not satisfy the criteria.

One way of combining the scores for a cluster can be to multiply the average scores together. In an embodiment, the formula for the cluster rank can be $$\log(n) \times (1-\text{AvSpam}) \times (\text{AvLen}) \times (\text{RepostRatio}) \times (\text{LinkRatio}) \times (\text{AvAuth}) \times (\text{UURatio})$$

where n is the number messages in a cluster; AvSpam is the average spam score for messages in a cluster; AvLen is the average token length for messages in a cluster; RepostRatio is a ratio of messages that have been reposted versus messages that have not been reposted for messages in the cluster; LinkRatio is a ratio of messages having a link versus messages not having a link for messages in the cluster; AvAuth is the average authority score for messages in the cluster; and UURatio is the ratio of different (unique) authors to messages for the cluster.

Adding Messages to a Message Cluster

When a message is received, the message can be analyzed to determine if the message can be added to a message cluster. As an initial step, the message can be compared with a filter to determine if the message can be discarded or excluded from further consideration. This can be based, for example, on the spam score for the message as described above. If the spam score for the message is above (or below) a threshold value, no further work can be performed on the message.

If the spam score is below (or above) the threshold value, the message can be analyzed to determine if it can be added to a cluster. The message can be parsed to determine the tokens within the message. This can allow formation of a message token vector. The tokens within the message can then be compared with the tokens for any existing clusters to develop a similarity score between the message and the existing clusters.

In an embodiment, a normalized frequency of appearance for terms within a document can be used as a weighting factor for determining a similarity score. A term frequency-inverse document frequency (TFIDF) value is an example of a normalized frequency of appearance. A TFIDF value can be computed for each token appearing in a corpus of documents, such as a corpus of messages. This TFIDF value for each token can then be used as a weighting factor for determining a similarity score. For determining a TFIDF value, the "term frequency" (TF) can refer to the number of times a token occurs, either within a message or within the messages in a cluster. The inverse document frequency (IDF) can refer to the total number of messages within a corpus divided by the number of documents within the corpus that contain the particular token. Optionally, the inverse document frequency can be based on a logarithm of the total messages divided by the number of documents containing a token.

Using TFIDF values, a similarity score between a message cluster and a message can be computed. As an initial step for computing a similarity score, a characteristic token "vector" can be defined for a cluster. The characteristic token vector can include tokens that represent the messages within a cluster. This characteristic vector can be referred to as a cluster token vector. In an embodiment, the cluster token vector can include the most common terms in a cluster. In another embodiment, the cluster token vector can include tokens selected based on frequency as weighted by TFIDF values. The cluster token vector can include any convenient number of tokens. In an embodiment, the cluster token vector can include at least 6 tokens, or at least 8 tokens, or at least 10 tokens. Additionally or alternately, the token vector can include 20 tokens or less, or 15 tokens or less, or 12 tokens or less, or 10 tokens or less. As described above, the number of tokens included in the cluster token vector refers to the number of non-zero values included in the vector.

When a message is received, the tokens from the message can be compared with the tokens from a characteristic or cluster token vector. As described above, the tokens from the message can also be thought of as a vector representing the content of the message. A vector dot-product can then be determined between the message tokens and the cluster tokens. If TFIDF values are not used, this could just represent a simple counting of the number of common tokens between a message and the cluster. Using the TFIDF values can allow a weighted value to be formed. For example, even though a message may only match three tokens from a cluster token vector, if the terms are sufficiently unusual, the TFIDF weights for the terms could result in the message having a high score relative to the cluster. By contrast, if a cluster token vector contains terms that are more common, a message may need to match a greater number of terms to achieve a high score relative to the cluster.

In an embodiment, the similarity value for a message relative to a cluster can be calculated without normalizing the similarity value based on the token length of the message. When a similarity value is computed for a larger document, a normalization factor can be used to account for the length of the document. A longer document has a greater likelihood of containing any given word or other token. For example, a normalization factor could be the number of occurrences of a token within a document divided by the total number of words in the document. Normalization based on the length of a document can account for the fact that a short document that contains a token may be more relevant than a longer document that contains the same token. Unfortunately, normalization can be a time intensive procedure, as it typically must be performed on a per-document basis.

For micro-blog messages or other limited length messages, the total number of possible tokens can be constrained by the number of available characters. While there can be some variation in length of the messages, the length variation can be less important than the length variations between typical documents. As a result, normalization based on the token length of the message can be avoided. This can result in substantial savings of computational time when computing similarity values.

A similarity value can be calculated for a message relative to each message cluster in existence. This similarity value can be used to determine whether the message is added to a cluster. An initial check can be made to determine whether any similarity value for a message is greater than a similarity threshold value. If the message does not have a sufficiently high similarity value relative to any message cluster, the message is not added to an existing cluster. If at least one similarity value is greater than the similarity threshold, the message can be added to the message cluster that produces the highest similarity score. After the message is added to the message cluster, the cluster token vector and cluster rank can be recalculated.

A message can have a low similarity score relative to existing clusters for at least two reasons. One reason can be that the message has content that is of low quality. However, some messages may have desirable content, but a cluster has not been formed that matches the content. To account for this situation, when a message is not added to any cluster due to low similarity scores, the message can be checked to determine if a new message cluster can be formed.

To determine if a new message cluster can be started, the quality value for the message can be used. Additional factors can also be used. For example, a seed condition for starting a new cluster could require a minimum quality value for the message in combination with the presence of a link in the message. Or the seed condition could require that the message has a minimum authority score in addition to a link. Still another option can be to require a minimum token length for the message, such as requiring a seed message to contain at least 5 tokens or at least 7 tokens. Any other convenient combination of message quality features can be used to identify a suitable message for starting a new cluster.

Providing Message Clusters as Search Results

Based on the message clusters formed from messages, the message clusters can be incorporated into a document corpus used by a search engine for providing results to a search query, such as a keyword search query. A message cluster can be matched to a search query by using the cluster token vector for the message cluster as the contents of the cluster. Alternatively, an expanded token vector (that contains a larger number of tokens found in the cluster) can be used to determine a match between a cluster and a search query. The messages in a matching message cluster can then be provided as a group in response to a search query.

Maintenance of Message Clusters

Due to the nature of micro-blogs and other short messages, the topics of interest can change rapidly. This can result in constant creation of new message clusters. This can also result in some message clusters becoming stagnant, as fewer messages become available that match a given cluster token vector. One way of reducing the resources necessary to manage message clusters can be to have mechanisms for removing clusters and/or messages within clusters.

One option for identifying a cluster for removal can be based on the age of the cluster. A sufficiently old cluster can be removed or deleted based on the age of the initial message in the cluster, or based on the average age of messages in the cluster. Another option can be to have a variable time scale for deletion of a message cluster that also includes the ranking score of the cluster. Higher ranked clusters can then be kept for a longer period of time.

Still another option can be to remove old messages from a cluster. Again, just the age of a message can be used, or a combination of message quality value and time can be used for removing a message from a cluster. The similarity between a message and the current cluster token vector can also be a factor. Removing individual messages from a cluster can provide a way to allow a cluster to continuously refresh, as removing older messages can shift the cluster token vector to reflect the content of more recent messages. Removing messages can also cause the size of a cluster to shrink. Another option can be to remove a cluster if the number of messages in a cluster falls below a threshold value. One option can be to base the threshold value on the maximum size (largest number of messages) that were contained in the cluster at any time. In such an embodiment, a cluster could be removed when the number of messages falls to less than half of the maximum size. This can reduce the overhead for removing clusters that developed a large size due to being temporarily of great interest.

Example of Processing a Message for Cluster Addition

FIG. 1 shows an example of a flow diagram for processing a message to identify whether the message should be added to a cluster. An incoming message can be received 110 from a suitable source. For example, this can be a message feed from a message service provider or a micro-blog service provider. The received message can then be tested against a pre-filter 120. One option can be to use a quality value for the message as a pre-filter. If the quality value for the message is below a threshold value, the message can be discarded 190 with no further processing. Alternatively, the message can be discarded due to belonging to a predetermined category, such as originating from a known spam source.

If the message is retained after the pre-filter, the message can be evaluated for similarity to known clusters 130. This can be accomplished, for example, by comparing a token vector for the message with a token vector for each cluster. If the message has a similarity score greater than a threshold value for at least one cluster, the message can be selected for addition to a cluster 140. The message can be added to the cluster having the highest similarity score with the message. The cluster token vector and the cluster ranking can then be updated 150 based on the addition of the message to the cluster.

If the message does not have a similarity score greater than the threshold value relative to any cluster, the message can be evaluated for use as a seed for a new cluster 160. If the message satisfies the seed requirements, a new cluster can be started 170 based on the message. The cluster token vector and cluster ranking for the cluster can initially be calculated 180 based on the message. If the message is not suitable for use as a seed for a cluster, the message can be discarded 190.

Additional Examples

In an embodiment, a method is provided for organizing messages into clusters. Optionally, the method can be provided in the form of computer executable instructions embodied on computer storage media. A plurality of messages 210 can be received. The messages can contain a limited number of characters, such as less than about 250 characters. The messages can be parsed 220 to form message token vectors.

The parsed messages can then be filtered 230 to discard at least one message. Similarity scores can then be calculated 240 for the filtered plurality of messages relative to one or more message clusters. At least one message can be added 250 to a message cluster based on a similarity score being greater than a threshold value. After the addition, the cluster token vector for the message cluster can be updated 260.

In another embodiment, a method is provided for providing a message cluster in response to a search query. Optionally, the method can be provided in the form of computer executable instructions embodied on computer storage media. A message can be received 310 that contains less than a specified number of characters, such as less than about 250 characters. The message can be parsed 320 to form a message token vector. A cluster token vector can be determined 330 for a message cluster. A similarity score can be calculated 340 for the message relative to the message cluster. The message can be added 350 to the message cluster based on the similarity score being greater than a threshold value. The cluster token vector for the message cluster can then be updated 360. The updated cluster token vector can be matched 370 to a search query. The message cluster can then be provided 380 in response to the search query.

In still another embodiment, a method is provided for providing a message cluster in response to a search query. Optionally, the method can be provided in the form of computer executable instructions embodied on computer storage media. A message can be received 410 that contains less than a specified number of characters, such as less than about 250 characters. A plurality of message quality feature values can be calculated 420 for the message. The message can be added 430 to a message cluster. A cluster ranking can be calculated 440 for the message cluster based on averages of quality feature values for the messages in the cluster. A cluster token vector can be determined 450 for the message cluster. A search ranking can be calculated 460 for the message cluster relative to a search query. The message cluster can be provided 470 in response to the search query.

Having briefly described an overview of various embodiments of the invention, an exemplary operating environment suitable for performing the invention is now described. Referring to the drawings in general, and initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 5:
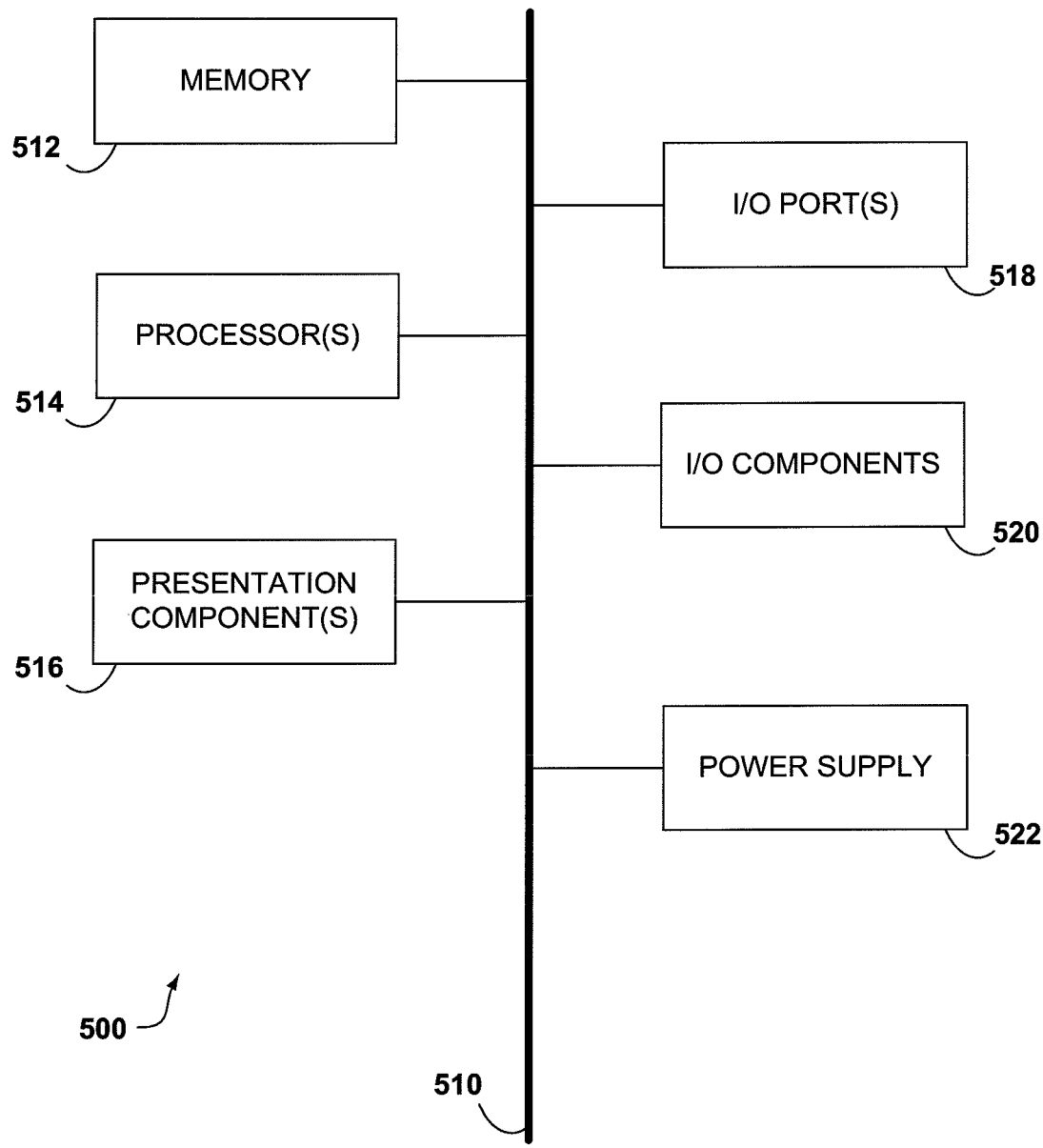
FIG. 5 is a block diagram of an exemplary computing environment suitable for use in implementing embodiments of the present invention.

With continued reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 500. In an embodiment, the computer storage media can be selected from tangible computer storage media. In another embodiment, the computer storage media can be selected from non-transitory computer storage media.

The memory 512 includes computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 520. The presentation component(s) 516 present data indications to a user or other device. Exemplary presentation components include a display device, speaker, printing component, vibrating component, and the like.

The I/O ports 518 allow the computing device 500 to be logically coupled to other devices including the I/O components 520, some of which may be built in. Illustrative components include a microphone, joystick, game pad, satellite dish, scanner, printer, wireless device, etc.

Figure 6:
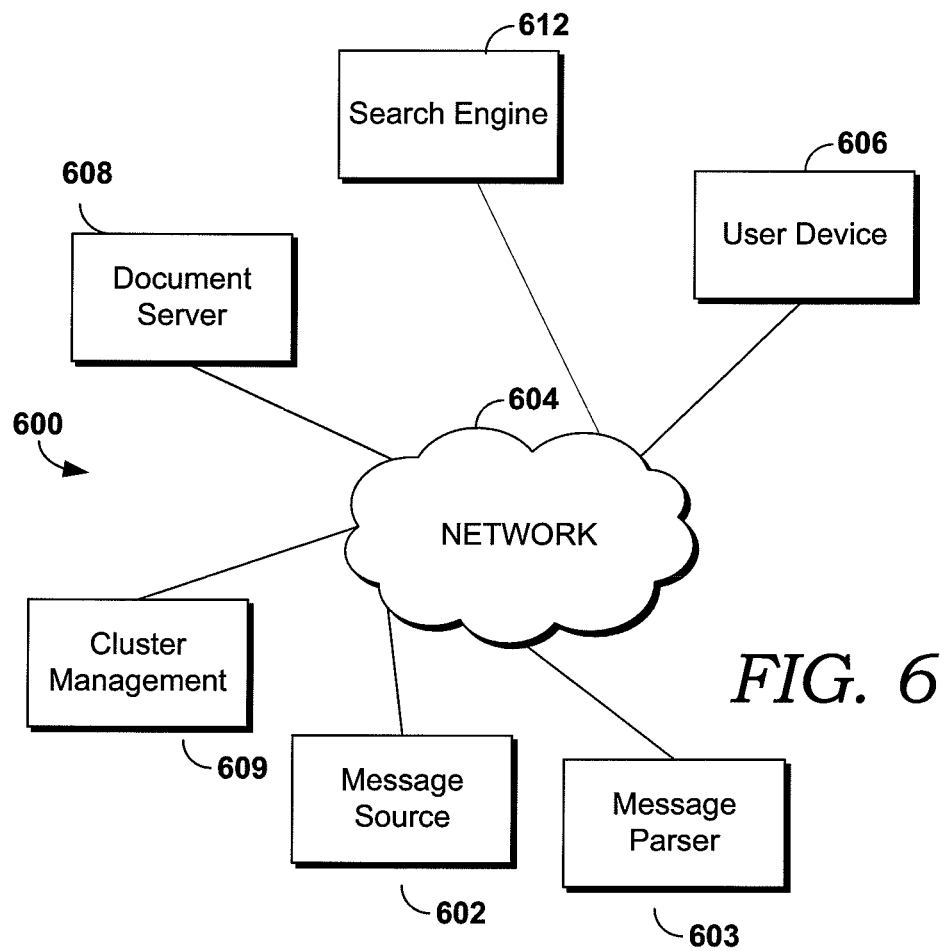
FIG. 6 schematically shows a network environment suitable for performing embodiments of the invention.

With additional reference to FIG. 6, a block diagram depicting an exemplary network environment 600 suitable for use in embodiments of the invention is described. The environment 600 is but one example of an environment that can be used in embodiments of the invention and may include any number of components in a wide variety of configurations.

The description of the environment 600 provided herein is for illustrative purposes and is not intended to limit configurations of environments in which embodiments of the invention can be implemented.

The environment 600 includes a network 604, a user device 606, a document server 608 and a search engine 612. The environment also includes a message source 602, a message parser 603, and a cluster management module 609. The network 604 includes any computer network such as, for example and not limitation, the Internet, an intranet, private and public local networks, and wireless data or telephone networks. The user device 606 can be any computing device, such as the computing device 500, from which a search query can be provided. For example, the user device 606 might be a personal computer, a laptop, a server computer, a wireless phone or device, a personal digital assistant (PDA), or a digital camera, among others. In an embodiment, a plurality of user devices 606, such as thousands or millions of user devices 606, can be connected to the network 604. The search engine 612 includes any computing device, such as the computing device 500, and provides functionalities for a content-based search engine. Document server 608 represents any type of computer device that can provide documents selected by a user based on results responsive to a search query.

Message source 602 can be any convenient source of messages having a small number of characters. Message source 602 can represent a server providing micro-blog input or another type of public or semi-public messages. Message parser 603 can parse messages from message source 602 to form message token vectors for the messages. The parsed messages can then be analyzed by cluster management module 609. Cluster management module 609 can add messages to a message cluster, start a new message cluster, or discard a message. Cluster management module 609 can also delete clusters or remove messages from clusters. Message clusters formed and/or managed by cluster management module 609 can be included as part of the documents provided by document server 608.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, one or more computer-storage media storing computer-useable instructions are provided that, when executed by a computing device, perform a method for clustering messages. The method includes receiving a plurality of messages, each message containing about 250 characters or less. The messages are parsed to form message token vectors for the messages. The parsed messages are filtered to discard at least one message from the plurality of messages. Similarity scores are calculated for the filtered plurality of messages relative to one or more message clusters, the message clusters having cluster token vectors, the similarity score being based on the message token vectors and the cluster token vectors, the similarity scores being calculated without normalization of the message token vectors relative to a length of the messages. At least one message is added to a message cluster based on the at least one message having a similarity score greater than a similarity threshold value. The cluster token vector for the message cluster containing the added message is updated.

In another embodiment, one or more computer-storage media storing computer-useable instructions are provided that, when executed by a computing device, perform a method for clustering messages. The method includes receiving a message containing about 250 characters or less. The message is parsed to form a message token vector for the message. A cluster token vector is determined for a message cluster, the cluster token vector corresponding to a number of tokens that is less than a token threshold value. A similarity score for the message relative to a message cluster is calculated based on a product of the cluster token vector and the message token vector, the similarity score being calculated without normalization of the message token vector relative to a length of the message. The message is added to the message cluster based on the similarity score being greater than a similarity threshold value. The cluster token vector is updated based on the addition of the message to the message cluster. The updated cluster token vector is matched to a search query. The message cluster is then provided in response to the search query.

In still another embodiment, one or more computer-storage media storing computer-useable instructions are provided that, when executed by a computing device, perform a method for identifying message clusters that are responsive to a search query. The method includes receiving a message containing about 250 characters or less. A plurality of quality feature values are calculated for the message, the plurality of quality feature values including two or more of a spam value, a message length value, a reposting value, a link value, and an authority value. The message is added to a message cluster, the message cluster containing one or more additional messages. A cluster ranking for the message cluster is calculated based on averages of quality feature values for messages in the message cluster. A cluster token vector for the message cluster is determined, the cluster token vector corresponding to a number of tokens less than a token threshold value. A search ranking is calculated for the message cluster relative to a search query, the search ranking for the message cluster being based on at least the cluster ranking of the message cluster and a match ranking of the cluster token vector relative to the search query. The message cluster is then provided in response to the search query From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer-implemented method for clustering messages, comprising:
receiving a plurality of messages, each message containing 250 characters or less;
parsing the characters in each message to form strings of one or more characters that are considered together based on separation of each string of one or more characters by a character, each string of one or more characters that are considered together comprising a token;
forming message token vectors for the messages, a message token vector having elements corresponding to the each of the tokens in a message;
filtering the parsed messages to discard at least one message from the plurality of messages;
calculating similarity scores for the filtered plurality of messages relative to one or more message clusters, a message cluster having a cluster token vector corresponding to a representative number of the tokens in the message cluster, the similarity score being based on the message token vectors and the cluster token vectors, the similarity scores being calculated without normalization of the message token vectors relative to a length of the messages;

adding at least one message to a message cluster based on the at least one message having a similarity score greater than a similarity threshold value; and updating the cluster token vector for the message cluster containing the added message.

2. The computer-implemented of claim 1, wherein each message in the plurality of messages contains 160 characters or less.

3. The computer-implemented of claim 1, wherein the similarity scores are calculated without normalization of the message token vectors relative to a token length of the messages, the token length corresponding to a number of different tokens in a message.

4. The computer-implemented of claim 1, wherein the cluster token vector corresponds to a number of tokens that is less than a token threshold value.

5. The computer-implemented of claim 1, wherein filtering the plurality of messages comprises removing at least one message based on a spam score for the message.

6. The computer-implemented of claim 1, wherein filtering the plurality of messages comprises removing at least one message based on a domain and/or a user identification associated with the message.

7. The computer-implemented of claim 1, further comprising:

identifying a message from the filtered plurality of message, the identified message having a similarity score less than the similarity threshold value relative to the one or more message clusters; and starting a new message cluster using the identified message based on the identified message satisfying one or more criteria for forming a new message cluster.

8. The computer-implemented of claim 7, wherein the one or more criteria for forming a new message cluster include a presence of a link within the identified message and the presence of at least 5 tokens within the identified message.

9. The computer-implemented of claim 1, further comprising removing a message from a second message cluster from the one or more message clusters, the removal of the message being based on a quality value for the removed message, an age of the removed message, or a combination thereof.

10. The computer-implemented of claim 1, further comprising deleting a message cluster from the one or more message clusters, the deletion of the message cluster being based on a cluster ranking for the deleted message cluster, an age of the deleted message cluster, a size of the deleted message cluster relative to a prior size, or a combination thereof.

11. A computer-implemented method for clustering messages, comprising:

receiving a message containing 250 characters or less, the characters forming a plurality of tokens, each token corresponding to a grouping of one or more characters within the message, the plurality of tokens in a message representing the content of the message;

parsing the message to form a message token vector for the message, the message token vector having elements corresponding to the plurality of tokens in the message;

determining a cluster token vector for a message cluster, the cluster token vector corresponding to a representative number of tokens in the message cluster less than a token threshold value;

calculating a similarity score for the message relative to a message cluster based on a product of the cluster token vector and the message token vector, the similarity score being calculated without normalization of the message token vector relative to a length of the message;

adding the message to the message cluster based on the similarity score being greater than a similarity threshold value;

updating the cluster token vector based on the addition of the message to the message cluster;

matching the updated cluster token vector to a search query; and providing the message cluster in response to the search query.

12. The computer-implemented of claim 11, wherein each message in the plurality of messages contains about 160 characters or less.

13. The computer-implemented of claim 11, wherein the similarity scores are calculated without normalization of the message token vectors relative to a token length of the messages, the token length corresponding to a number of different tokens in a message.

14. The computer-implemented of claim 11, wherein the cluster token vector is represented by 12 tokens or less.

15. A computer-implemented method for identifying message clusters that are responsive to a search query, comprising:

receiving a message containing 250 characters or less, the characters forming a plurality of tokens, each token corresponding to a grouping of one or more characters within the message;

calculating a plurality of quality feature values for the message, the plurality of quality feature values including two or more of a spam value, a message length value, a reposting value, a link value, and an authority value;

adding the message to a message cluster, the message cluster containing one or more additional messages;

calculating a cluster ranking for the message cluster based on the quality feature values for messages in the message cluster;

determining a cluster token vector for the message cluster, the cluster token vector corresponding to a representative number of tokens in the message cluster less than a token threshold value;

calculating a search ranking for the message cluster relative to a search query, the search ranking for the message cluster being based on at least the cluster ranking of the message cluster and a match ranking of the cluster token vector relative to the search query; and providing the message cluster in response to the search query, wherein the cluster ranking for the message cluster is based on a number of messages in the message cluster, an average spam score for messages in the message cluster, an average token length for messages in the message cluster, a ratio of messages that have been reposted and that have not been reposted in the message cluster, a ratio of messages that contain a link and messages that do not contain a link in the message cluster, an average authority score for messages in the cluster, and a ratio of the number of different message authors versus the number of messages in the cluster.

16. The computer-implemented of claim 15, wherein the cluster token vector is represented by 12 tokens or less.

17. The computer-implemented of claim 15, wherein the plurality of quality feature values include at least the spam value, the message length value, the reposting value, the link value, and the authority value.

18. The computer-implemented of claim 15, wherein the cluster ranking for the message cluster is further based on a number of different users associated with the messages in the cluster.

19. The computer-implemented of claim 15, wherein the cluster ranking for the message cluster is based on averages and/or ratios derived from the quality feature values for the messages in the message cluster.

\* \* \* \* \*